United States Patent

[11] 3,602,241

| [72] | Inventor | Louis M. Puster<br>Knoxville, Tenn. |
|---|---|---|
| [21] | Appl. No. | 16,479 |
| [22] | Filed | Mar. 4, 1970 |
| [45] | Patented | Aug. 31, 1971 |
| [73] | Assignee | Robertshaw Controls Company<br>Richmond, Va. |

[54] PNEUMATIC CONTROL SYSTEM AND RESET VALVE FOR SUCH A SYSTEM OR THE LIKE
14 Claims, 9 Drawing Figs.

[52] U.S. Cl. .................................................. 137/84,
236/47, 236/82, 137/113, 137/85, 137/118
[51] Int. Cl. .................................................. G05d 23/00,
G05b 11/50
[50] Field of Search .......................................... 137/84, 85,
86, 113, 118; 236/47

[56] References Cited
UNITED STATES PATENTS
3,312,710  10/1965  Nilles ......................... 236/47
3,305,172  2/1967  Duchek ........................ 236/47 X

*Primary Examiner*—Alan Cohan
*Attorneys*—Auzville Jackson, Jr., Robert L. Marben and Candor, Candor & Tassone ABSTRACT: A pneumatic control system having a source of control fluid providing two different control pressure levels for respectively switching the control device of the system from one operating condition thereof to another operating condition thereof, the control device comprising a pair of condition controller means each having a sensor and a bleed-type pneumatic valve operated thereby together with relay means operatively interconnected to the source for directing a branch signal of the control fluid to the source for directing a branch signal of the control fluid to a pneumatically operated device in relation to a pilot signal directed to a pilot chamber of the relay means by one of the control means. A pressure responsive means is provided for switching the system from one condition controller means to the other in relation to the pressure level of the source, and a reset means is provided for overriding the pressure responsive means.

INVENTOR.
LOUIS M. PUSTER

BY

Cander, Candor & Tarome

HIS ATTORNEYS

INVENTOR.
LOUIS M. PUSTER

BY

Cauden, Cauden & Tarson

HIS ATTORNEYS

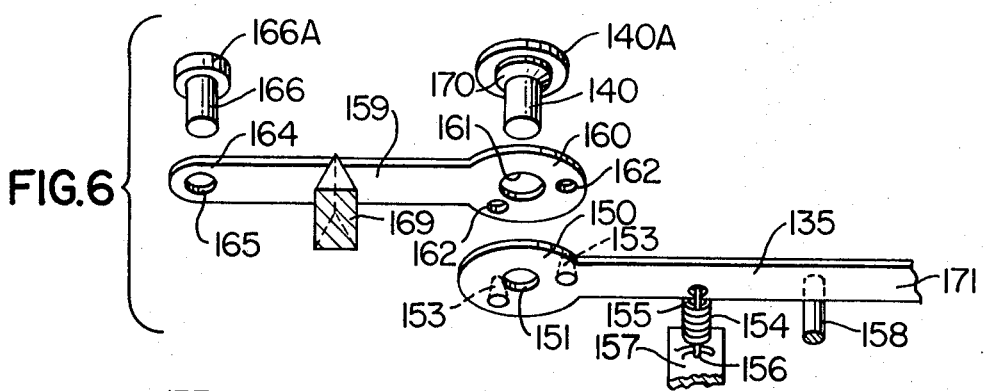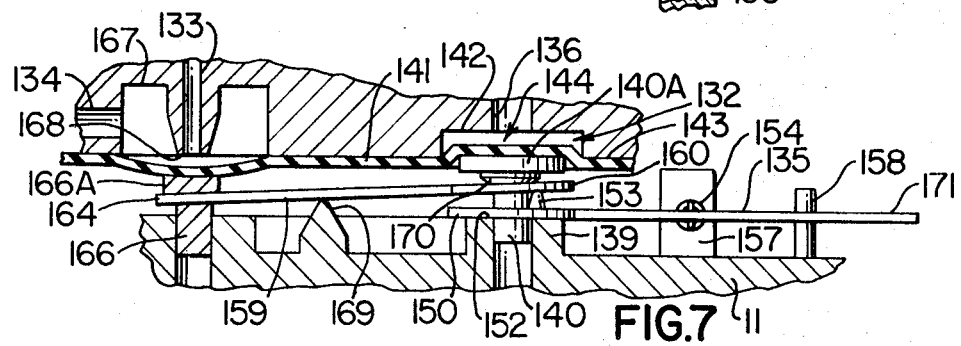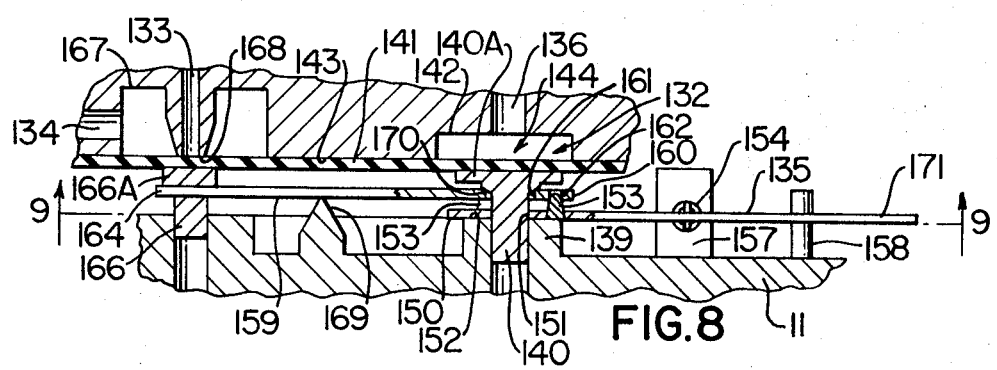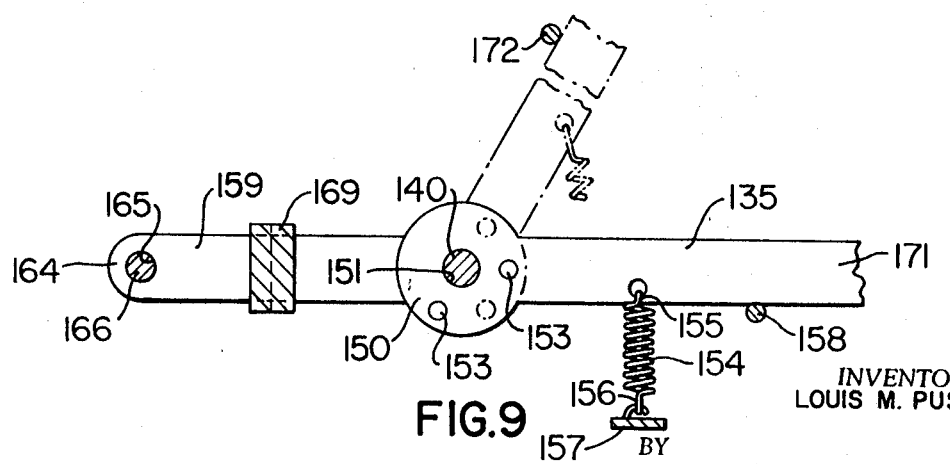

PNEUMATIC CONTROL SYSTEM AND RESET VALVE FOR SUCH A SYSTEM OR THE LIKE

This application is related to the copending patent application, Ser. No. 812,757, filed Apr. 2, 1969, and is assigned to the same assignee to whom this application is assigned.

This invention relates to an improved pneumatic control system as well as to a reset means for such a pneumatic control system or the like.

It is well known from the aforementioned patent application that pneumatic control systems have been provided wherein a pneumatic source has two different control pressure levels so that the system will operate a pneumatically operated device in one manner when the source is providing one of the control pressure levels and will operate the control device in another manner when the pneumatic sources is providing the other control pressure level thereof.

For example, such control systems have been provided for controlling pneumatically operated heat exchanger devices of a building or the like wherein the one control pressure level is utilized to operate the pneumatically operated heat exchanger device for daytime operation thereof and, at nighttime, the control pressure of the pneumatic source is changed over to provide its other control pressure level for operating the heat exchanger device for nighttime operation thereof.

One of the features of the aforementioned patent application is to provide a pneumatic control system of the above described type wherein two condition controller means are provided for the system to respectively operate at the different control pressure levels and each having a sensor and a bleed-type pneumatic valve operated thereby.

In contrast, one of the features of this invention is to provide improved reset means for such a control system or the like wherein such reset means can be manually operated to reset the system to day operation when it is operating at night operation.

In particular, one embodiment of this invention provides a pneumatic control system comprising a pair of condition controller means each having a sensor and a bleed-type pneumatic valve operated thereby for respectively directing a pneumatic pilot signal to a pilot chamber of a relay means which is operatively interconnected to the pneumatic source for directing a branch signal of the control fluid to the pneumatically operated device in relation to the particular pilot signal being received in the pilot chamber thereof. First and second passage means are respectively provided to be adapted to interconnect the source to the valves of the controller means, a pressure responsive means being disposed in the first passage means for preventing fluid communication therethrough when the source is at one pressure level thereof and permitting fluid communication therethrough when the source is at its other pressure level. A third passage means is adapted to interconnect the first passage means intermediate the pressure responsive means and the one controller means to the pilot chamber and is adapted to interconnect the second passage means to the pilot chamber, a switching means being disposed in the third passage means and having one position for interconnecting only the second passage means to the pilot chamber whereby the pilot signal for the relay means is provided only by the other controller means and having another operating position for interconnecting only the first passage means to the pilot chamber whereby the pilot signal for the relay means is provided only by the one controller means. The reset means is disposed in fluid communication with the first passage means between the pressure responsive means and the one controller means, the reset means venting the switching means to the atmosphere so that the other controller means is operative when the reset means is manually operated to a reset position thereof and the pressure responsive means is attempting to cause operation of the one controller means.

Therefore, it is an object of this invention to provide an improved pneumatic control system having one or more of the novel features set forth above or hereinafter shown or described.

Another object of this invention is to provide an improved reset means for such a control system or the like, the reset means having one or more of the novel features set forth above or hereinafter shown or described.

Other objects, use and advantages of this invention are apparent from a reading of this description which proceeds with reference to the accompanying drawings forming a part thereof and wherein:

FIG. 6 is an exploded perspective view of the reset means of the system of FIG. 2.

FIG. 7 is a fragmentary cross-sectional view of the reset means in its normally open position.

FIG. 8 is a view similar to FIG. 7 illustrating the reset means in it actuated and closed position.

FIG. 9 is a cross-sectional view taken on line 9–9 of FIG. 8 and illustrates in phantom lines the reset position of the reset means.

Figure 1:
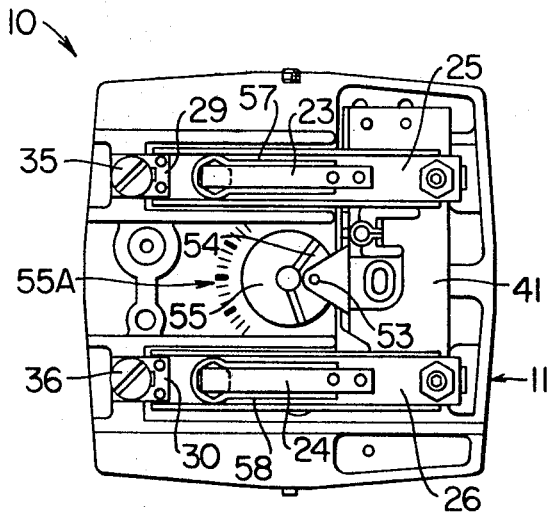
FIG. 1 is a front view of the improved control device of this invention with the cover plate thereof removed.

While the various features of this invention are hereinafter described and illustrated as being particularly adapted to provide a pneumatic control system for controlling a pneumatically operated heat exchanging device, it is to be understood that the various features of this invention can be utilized singly or in any combination thereof to provide control means for other apparatus as desired.

Therefore, this invention is not to be limited to only the embodiments illustrated in the drawings, because the drawings are merely utilized to illustrate one of the wide variety of uses of this invention.

Figure 2:
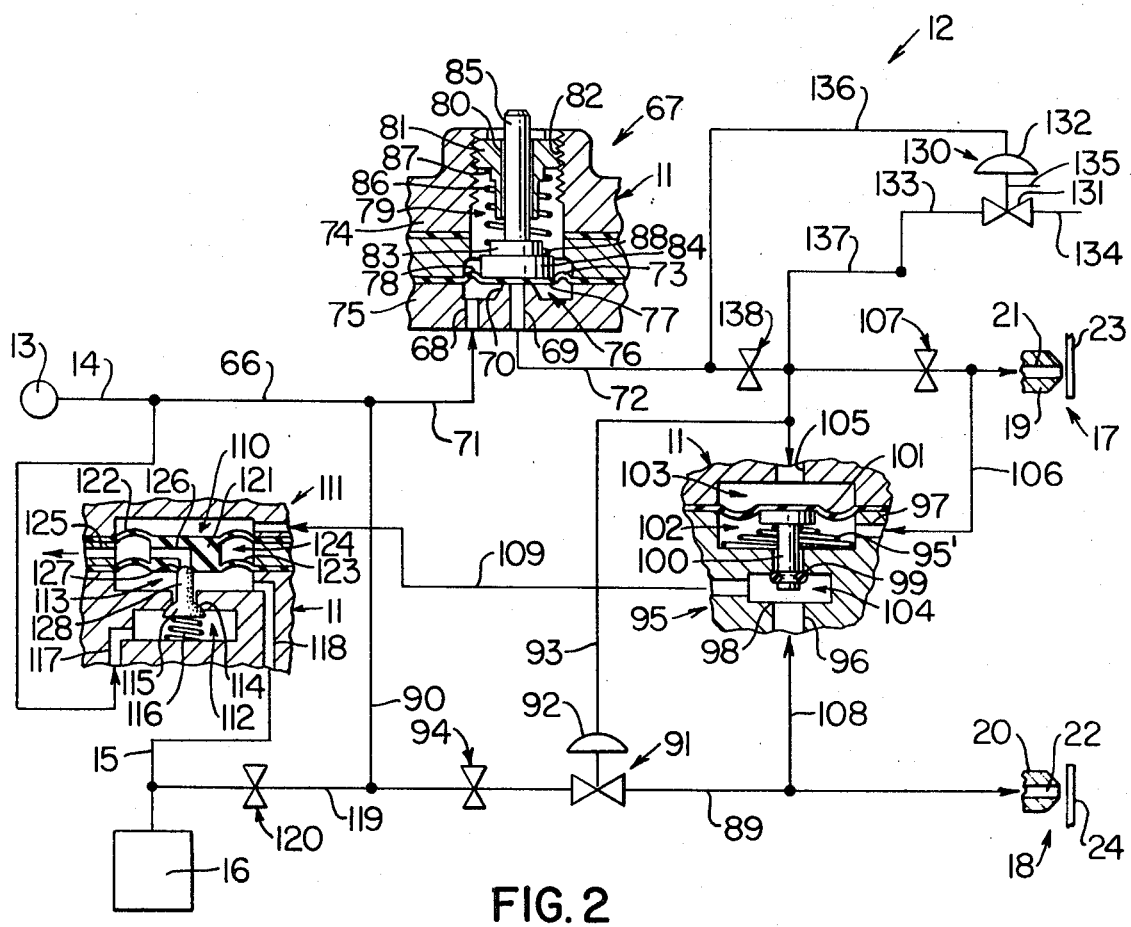
FIG. 2 is a schematic view, partially in cross section, illustrating the improved pneumatic control system of this invention utilizing the control device of FIG. 1.

Referring now to FIG. 1, the improved control device of this invention is generally indicated by the reference numeral 10 and comprises a housing means 11, illustrated in fragmentary cross-sectional portions in FIG. 2 wherein the improved control system of this invention is generally indicated by the reference numeral 12 and comprises a pneumatic control source 13 adapted to selectively supply pneumatic pressure fluid at two different pressure levels, such as 16 p.s.i. and 25 p.s.i. and be interconnected to an inlet passage means 14 of the control device 10. The control device 10 is adapted to have an outlet passage 15 thereof interconnected to a pneumatically operated device 16 of the system 12. The pneumatically operated device 16 of the system 12 of this invention comprises a pneumatically operated heat exchanging device which has its output temperature effect decreased upon an increase in pneumatic pressure fluid being directed thereto by the control device 10 of this invention in a manner hereinafter described and has its output temperature effect increased upon a decrease in the pneumatic pressure fluid being directed thereto by the control device 10 of this invention in a manner hereinafter described.

Figure 3:
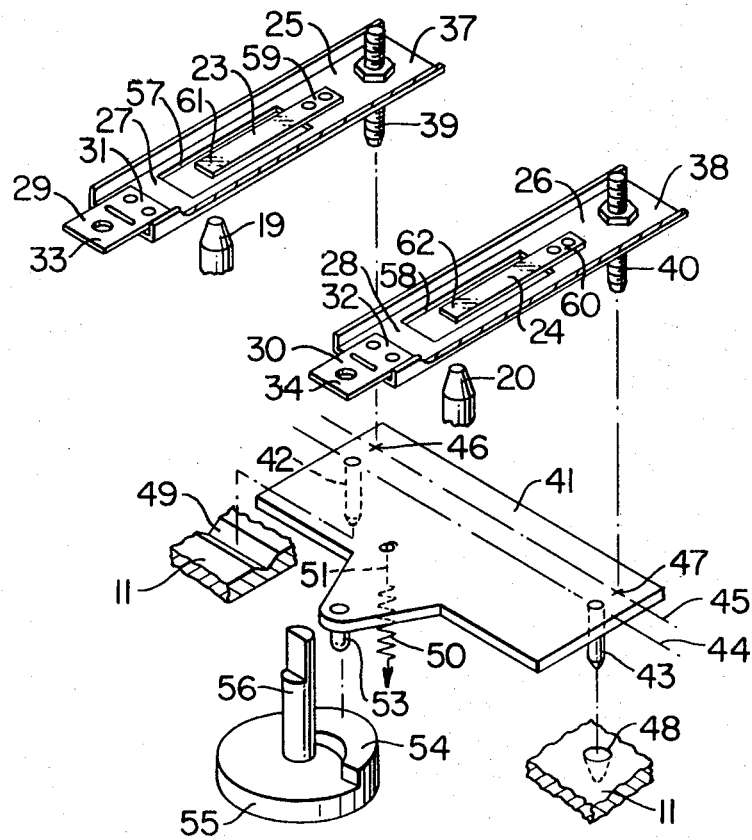
FIG. 3 is an enlarged, exploded perspective view of certain of the parts of the control device of FIG. 1.

The housing 11 of the control device 10 as illustrated in FIG. 2 carries a pair of condition control means respectively and generally indicated by the reference numerals 17 and 18 in FIG. 2 and comprising bleed-type pneumatic valves 19 and 20 respectively having the degree of opening or bleed of their outlets 21 and 22 controlled by bimetal members 23 and 24 respectively sensing the output temperature effect of the heat exchanger means 16 and respectively being carried in cantilevered fashion by levers or blade means 25 and 26, FIGS. 1 and 3, mounted to the housing means 11 of the control device 10.

Figure 4:
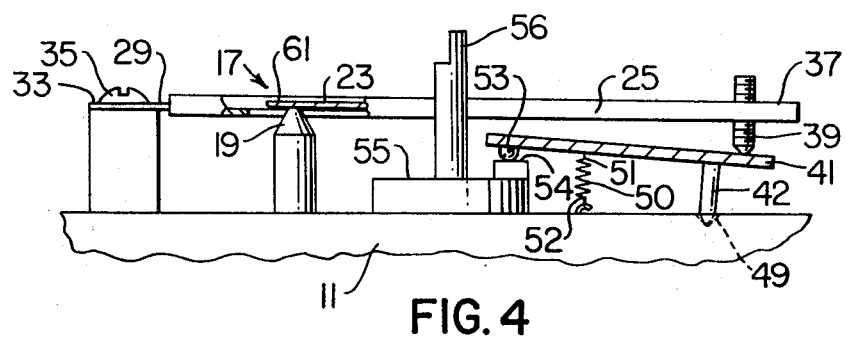
FIG. 4 is a fragmentary, enlarged side view of the control device of FIG. 1 and illustrates the adjustment means for the condition controller means of the control device.

In particular, the lever or blade means 25 and 26 respectively had adjacent ends 27 and 28 interconnected to leaf springs 29 and 30 at the ends 31 and 32 thereof with the leaf springs 29 and 30 respectively having the other ends 33 and 34 thereof fixed to the housing means 11 of the control device 10 by fastening means 35 and 36 as illustrated in FIGS. 1 and 4 so that the free ends 37 and 38 of the blades 25 and 26 are normally urged downwardly by the leaf springs 31 and 32 in FIG. 4 whereby adjusting screws or threaded members 39 and 40 respectively carried by the free ends 37 and 38 of the blades 25 and 26 will bear against a movable wobble or pivot plate 41 of the control device 10.

The pivot or wobble plate 41 carries a pair of downwardly extending pins 42 and 43 disposed along a line 44 of the plate 41 that is parallel to a line 45 on the plate 41 that passes through the respective points 46 and 47 of engagement of the threaded adjusting members 39 and 40 of the blades 25 and 26 as illustrated in FIG. 3. The housing means 11 of the control device 10 has a cone-shaped hole 48 and a V-shaped notch 49 formed therein which respectively receive the pins 43 and 42 of the pivot or wobble plate 41 so that the pivot plate is positively located on the housing 11 of the control device 10 and will not rotate thereon about either pin 42 or 43, a tension spring 50 having one end 51 attached to the plate 41 and the other end 52 thereof attached to the housing means 11 pulls the plate 41 downwardly at all times toward the housing 11 whereby a forward rounded pin 53 of the pivot plate 41 bears against a cam surface 54 of a cam member 55 rotatably mounted to the housing means 11 and having a control shaft 56 adapted to be interconnected to a control knob (not shown) wherein the operator can adjust the cam 55 relative to the control device 10 in relation to a temperature scale 55A, FIG. 1, to set the temperature that control system 12 is to maintain in the manner hereinafter described.

The tension spring 50 of the pivot plate 41 is so located relative to the three pivots 42, 43 and 53 of the plate 41 that the same is disposed within the triangle defined by the three pivots 42, 43 and 53 to positively maintain the plate pivot 53 against the cam surface 54 of the cam 55 in all of the operating positions of the cam 55, the hole 48 for the pivot pin 43 defining a center of rotation for the plate 41 and the V-shaped notch 49 for the pivot pin 42 preventing such rotation whereby the pivot plate assembly 41 is positively located on the housing means 11 of the control device 10. In this manner, rotation of the cam 55 will cause the plate 41 to pivot about the pivot line 44 in the manner illustrated in FIGS. 4 and 5 to adjust the location of the free ends 37 and 38 of the levers or blades 25 and 26 relative to the housing means 11 and, thus, the position of the bimetal members 23 and 24 relative to the bleed valves 19 and 20 whereby the control setting of the condition controller means 17 and 18 can be adjusted for a purpose hereinafter described.

Figure 5:
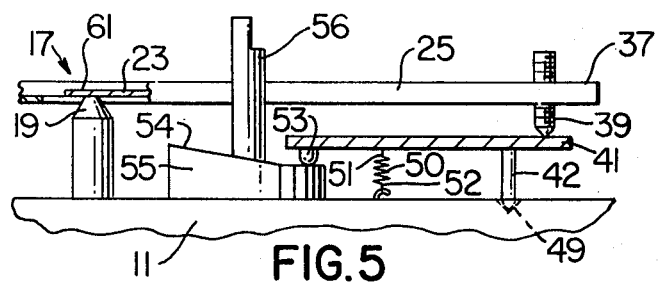
FIG. 5 is a view similar to FIG. 4 and illustrates the condition controller means in another adjusted position thereof.

The levers or blades 25 and 26 respectively have rectangular openings 57 and 58 passing therethrough intermediate the opposed ends thereof and the bimetal members 23 and 24 respectively have the ends 59 and 60 thereof secured to the blades 25 and 26 in such a manner that the free ends 61 and 62 of the bimetal members 23 and 24 are exposed at the cutouts 57 and 58 and are located over the valves 19 and 20 of the housing means 11 as illustrated in FIGS. 4 and 5. In this manner, the setting of the free ends 61 and 62 of the bimetal members 23 and 24 relative to the valves 19 and 20 of the condition controller means 17 and 18 can be adjusted by the cam 55 whereby movement of the cam 55 adjusts the free ends 61 and 62 of the bimetal members 23 and 24 relative to the respective valves 19 and 20 in the same direction toward or away from the valves 19 and 20.

In the control system 12 illustrated in FIG. 2, both bimetal blades 23 and 24 move or warp toward their respective valves 19 and 20 upon an increase in sensed temperature and move or warp away from their respective valves 19 and 20 upon a decrease in sensed temperature.

In this manner, the bimetal member 24 controls the heating operation of the pneumatically operated heat exchanging device 16 during daytime operation and the bimetal member 23 controls the heating operation of the pneumatically operated heat exchanging device 16 during nighttime operation thereof.

As illustrated in FIG. 2, the housing means 11 of the control device 10 is provided with a first passage means 66 that is adapted to be directly interconnected to the source 13 at the inlet 14 of the housing means 11 and to the outlet opening 21 of the valve 19. However, a pressure responsive means 67 is provided in the housing means 11 of the control device 10 in the first passage means 66 and is defined by an inlet 68 and an outlet 69 separated by a valve seat 70 of the housing 11 with the inlet 68 being interconnected to the part 71 of the first passage means 66 that leads from the source 13 and with the outlet 69 being interconnected to the part 72 of the passage means 66 that leads to the opening 21 of the valve 19.

The pressure responsive means 67 includes a flexible diaphragm 73 held between housing parts 74 and 75 to cooperate therewith and define a chamber 76 adjacent one side 77 of the diaphragm 73 and interconnected to the inlet 68 and adapted to be interconnected to the outlet 69 when the valve seat 70 is opened. The other side 78 of the flexible diaphragm 73 cooperates with the housing means 11 to define another chamber 79 that is interconnected to the atmosphere through an opening 80 in a fitting 81 carried in a threaded opening 82 formed in the housing means 11. A member 83 is disposed in the chamber 79 and has one end 84 adapted to engage against the side 78 of the diaphragm 73 and an opposed guide plunger end 85 that projects out through the opening 80 in the fitting 81. A compression spring 86 is disposed in the chamber 79 and has one end 87 bearing against the fitting 81 and the other end 88 thereof bearing against the enlarged end 84 of the member 83 so as to tend to maintain the end 84 against the side 78 of the diaphragm 73 whereby the member 83 will follow movement of the diaphragm member 73.

The force of the compression spring 86 is such that the same will maintain the flexible diaphragm 73 against the valve seat 70 so as to prevent fluid communication through the first passage means 66 when the pressure source 13 is providing a control pressure at the lower of its two levels, such as 16 p.s.i. so that when the pressure source 13 is at its lowest control level, the pressure source 13 is not interconnected to the outlet 21 of the valve 19 of the condition controller means 17 since the spring 86 maintains the diaphragm 73 closed against the valve seat 70. However, when the pressure source 13 is set to provide the higher of its two control pressure levels, such as 25 p.s.i., the force of the higher pressure level in the chamber 76 of the pressure responsive means 67 exceeds the force of the compression spring 86 so as to move the diaphragm 73 upwardly and thereby open the valve seat 70 so that the pressure source 13 at its higher pressure level is fluidly interconnected to the outlet 21 of the valve 19 of the condition controller means 17. In this manner, it can be seen that the pressure responsive means 67 permits fluid communication through the first passage means 66 when the pressure source 13 is providing its higher pressure control level and prevents fluid communication through the passage means 68 when the pressure source 13 is providing its lower control pressure level.

The housing means 11 has a second passage means 89 provided therein which is adapted to interconnect the outlet 22 of the valve means 20 of the condition controller means 18 to the source 13, the second passage means being illustrated in FIG. 2 as having a branch passage means 90 fluidly interconnected to the first passage 66 intermediate the source 13 and the pressure responsive means 67. A normally open pressure responsive valve means 91 is disposed in the passage means 89 intermediate the valve 20 of the condition controller means 18 and the source 13, the normally open pressure operated valve means 91 having a pneumatic actuator 92 therefor interconnected by a passage means 93 to the conduit 72 intermediate the outlet 69 of the pressure responsive means 67 and the nozzle 19 so that when the pressure responsive means 67 is moved to its open position by the pneumatic source 13 providing the higher control pressure level thereof, such source 13 is also interconnected to the actuator 92 of the normally open pressure operated valve means 91 to close the same and thereby prevent fluid communication through the second passage means 89 to the valve 20 of the condition controller means 18.

A restrictor 94 is disposed in the second passage means 89 intermediate the pressure operated valve means 91 and the source 13.

The housing means 11 of the control device 10 is provided with a pneumatically operated switching means 95 therein which, as illustrated in FIG. 2, comprises a pair of inlets 96 and 97 respectively formed in the housing means 11 and being separated from each other by a pair of second valve seats 98 and 99 formed in the housing means 11 and adapted to be opened and closed by a movable valve member 100 being carried by a flexible diaphragm 101 that cooperates with the housing means 11 to define two chambers 102 and 103 on opposed sides thereof. The chamber 102 is interconnected to the inlet 97 and is adapted to be fluidly interconnected to another chamber 104 formed in the housing means 11 when the valve seat 99 is opened, the inlet 96 also being adapted to be interconnected to the chamber 104 when the valve seat 98 is opened. The part 72 of the first passage means 66 is fluidly interconnected to a passage 105 formed in the housing means 11 and disposed in fluid communication with the chamber 103, the part 72 of the first passage 66 intermediate the passage 105 and the valve 19 of the condition controller means 17 also being interconnected to the chamber 102 by a passage means 106 that leads to the inlet 97. A restrictor 107 is disposed in the part 72 of the first passage means 66 intermediate the passage means 105 and 106 as illustrated in FIG. 2.

The inlet 96 of the switching device 95 is interconnected to the second passage means 89 by a branch passage means 108 that is disposed intermediate the normally opened pressure operated valve means 91 and the valve 20 of the controller means 18.

The chamber 104 of the switching device 95 is interconnected by a passage means 109 in the housing means 11 of the control device 10 to a pilot pressure chamber 110 of a pneumatic relay portion 111 of the control device 10.

As illustrated in FIG. 2, the pneumatic relay 111 has a pair of chambers 112 and 113 formed in the housing means 11 and being separated by a stationary valve seat 114 adapted to be opened and closed by a valve member 115 normally urged to its closed position by a compression spring 116 disposed in the chamber 112. The chamber 112 is adapted to be interconnected to the inlet 14 of the control device 10 by a passage means 117 formed in the housing means 11 so as to always be in fluid communication with the source 13 whereby the chamber 112 is the main pressure chamber of the relay 111. The chamber 113 is interconnected by a passage means 118 formed in the housing means 11 to the inlet 15 of the pneumatically operated heat exchanger device 16 whereby the chamber 113 is a branch pressure chamber of the relay 111 and supplies the varying pressure to the pneumatically operated device 16 to control the same in relation to the pilot signal being received in the pilot chamber 110 of the relay 111 by the controller means 17 or 18 in the manner hereinafter described.

The inlet 15 of the pneumatically operated device 16 is also interconnected to the second passage means 89 by a passage means 119 formed in the housing means 11 and having a restrictor 120 therein.

The pneumatic relay 111 has a movable valve seat member 121 carried by two flexible diaphragms 122 and 123 which are secured in the housing means 11 in such a manner that the same define a chamber 124 therebetween which is interconnected to the atmosphere by a passage means 125 formed in the housing means 11 whereby the chamber 124 is an exhaust chamber for relay 111. The diaphragm 122 cooperates with the housing means 11 to define the pilot pressure chamber 110 and the diaphragm 123 cooperates with the housing means 11 to define the branch pressure chamber 113.

The valve member 121 of the relay 111 has an opening 126 passing therethrough and interconnecting the exhaust chamber 124 to the branch pressure chamber 113 at a valve seat 127 of the valve member 121. However, the valve member 115 has an extension 128 adapted to pass through the stationary valve seat 114 and be engageable with the valve seat 127 of the valve member 121 to close the valve seat 127 and thereby prevent fluid communication between the branch pressure chamber 113 and the exhaust chamber 124.

The manual reset means of this invention for the control system 12 is generally indicated by the reference numeral 130 in FIG. 2 and comprises a pneumatically operated valve means 131 having a pneumatic actuator 132 for interconnecting a line or passage 133 to a port or passage 134 that leads to the atmosphere when the pneumatically operated actuator 132 is deactuated or when the actuator 132 is actuated and a manual lever 135 is moved to a reset position thereof as will be apparent hereinafter. However, normally when the actuator 132 is pneumatically actuated by having its chamber fluidly interconnected by a line or passage means 136 to the part 72 of the first passage 66 with the valve seat 70 in its open position, the valve means 131 is closed so that the conduit line 133 is disconnected from the atmosphere line or port 134.

The passage 133 is interconnected by a passage 137 to the part 72 of the first passage means 66 as well as to the passage 105 of the switching valve 95, the passages 105 and 137 joining to the part 72 of the first passage means 66 intermediate the restriction 107 and another restriction 138 disposed in the part 72 of the first passage 66 intermediate the juncture of the passage 136 thereof and the juncture of the passages 137 and 105 thereto as fully illustrated in FIG. 2.

The restriction 138 in the part 72 of the first passage means 66 is sized to be slightly larger than the restriction 107 therein so that even with the night leak port 21 being wide open, the pressure in line 72 between the restrictions 138 and 107 is substantially at the pressure of the source 13 and is adapted to feed through the passages 105 and 93 to the cutoff valve 91 to shutoff the flow of any fluid through the passage 89 to the day leak port nozzle 20 and reduces the air consumption of the device 10.

As illustrated in FIGS. 6–9, the manual reset means 130 of this invention can be formed as part of the control device 10 by the housing or frame means 11 providing a tubular extension 139 adapted to receive a plunger 140 having an enlarged head 140A engageable with a flexible diaphragm 141 carried by the frame means 11 and cooperating therewith to define the pneumatic actuator 132 that comprises a recess 142 in a surface 143 of the frame means 11 that is closed by the flexible diaphragm 141 to define a chamber 144 therebetween that is adapted to be in fluid communication with the passage means 136 previously described.

The lever 135 for the reset means 130 can have an end 150 provided with an opening 151 passing therethrough and adapted to telescopically receive the projection 140 while being rotatable on the end surface 152 of the tubular extension 139 of the frame means 11 about the axis of the projection 140 as illustrated in FIGS. 8 and 9, the end 150 of the lever 135 having two cone-shaped projections 153 extending therefrom toward the actuator 132 with projections 153 being off center relative to the diameter of the part 150 of the lever 135 whereby such projections 153 are disposed at approximately a 3:00 o'clock position and a 7:00 o'clock position when the lever 135 is in the full line position of FIG. 9. A tension spring 154 has one end 155 interconnected to the lever 135 and the other end 156 thereof interconnected to part 157 of the frame means 11 so that the force of the tension spring 154 normally tends to urge the lever 135 in a rotational direction about the projection 140 of the actuator 132 against a stop means 158 of the frame 11 as illustrated by full lines in FIG. 9 for a purpose hereinafter described.

Another lever 159 is provided for the reset means 130 of this invention and has an end 160 also provided with an opening 161 passing therethrough to telescopically receive the projection 140 as illustrated in FIG. 8 with the end 160 of the lever 159 being disposed intermediate the head 140A of the projection 140 and the manually operated lever 135. The end 160 of the lever 159 also has two openings 162 passing therethrough to respectively receive the cone-shaped projections 153 of the lever 135 when the lever 135 is in the full line position of FIGS. 8 and 9.

The lever 159 has the other end 164 thereof provided with an opening 165 for receiving a cylindrical projection 166 having an enlarged head 166A that is engageable with the flexible diaphragm 141 adjacent another recess 167 in the surface 143 of the frame means 11. The passage 133 is interconnected to the recess 167 by a valve seat 168 of the frame means 11 and the passage 134 to the atmosphere is also interconnected to the recess 167.

The lever 159 is adapted to pivot intermediate its ends 154 and 160 against a knife edge fulcrum 169 of the frame 11 as illustrated in FIGS. 6–9.

Since the lever 135 is normally held against the stop 158 by the tension spring 154, such position of the lever 135 causes the opening 162 of the lever 159 to be in alignment with the cone-shaped pins 153 of the lever 135 as illustrated by full lines in FIG. 9 whereby when the chamber 144 of the actuator 132 receives pressure fluid by the pressure responsive valve means 67 being opened to direct the source 13 into the part 72 of the first passage means 66, the flexible diaphragm 141 is moved downwardly whereby an enlargement 170 on the projection 140 of the diaphragm 141 pushes against the end 160 of the lever 159 and causes the same to pivot in a clockwise direction about the fulcrum line 169 as illustrated in FIG. 8 to hold the flexible diaphragm 141 in sealing engagement against the valve seat 168 of the passage 133 whereby the passage 133 previously described is disconnected from the atmosphere. However, when the chamber 144 is disconnected from the pressure source 13 in a manner hereinafter described, the chamber 144 returns to atmospheric condition so that the flexible diaphragm 141 no longer is imposing a downward force on the end 160 of the lever 159 whereby the valve seat 168 of the passage 133 is opened to interconnect the passage 133 to the atmosphere because of the passage 134.

However, during the previously described operation of the actuator 132 wherein the same is pressurized by the source 13 to move the diaphragm 141 against the valve seat 168 of the passage 133 as illustrated in FIG. 8, if it is desired to operate the control system 12 with its daytime bleed nozzle 20 even through the higher pressure source is being directed by the source 13 into the system 12, the operator can grasp the end 171 of the lever 135 and move the same from the stop 158 in opposition to the force of the tension spring 154 against another stop 172 as illustrated by phantom lines in FIG. 9 whereby such rotational movement of the lever 135 causes the cone projections 153 of the lever 135 to cam out of the openings 162 of the lever 159 and act against the undersurface of the end 160 of the lever to pivot the lever 159 on its fulcrum 169 as illustrated in FIG. 7 so as to interconnect the passage 133 to the atmosphere for a purpose hereinafter described. With the lever 135 now moved to the phantom position illustrated in FIG. 9, the same remains in such a position even though the operator releases the end 171 of the lever 135 because the force of the diaphragm 141 acting downwardly at the actuator 132 against the end 160 of the lever 159 presses the same in stacked relation against the pins 153 of the lever 135 with sufficient force to maintain the same in the phantom position of FIG. 9 by friction in opposition to the force of the tension spring 154. However, when the pressure in the chamber 144 is released, the tension spring 154 overcomes the friction force against the pins 153 to return the lever 135 back to the full line position illustrated in FIG. 9 where the pins 152 again are received in the openings 162 of the lever 159.

From the above description of applicants' improved pneumatic control system 12 and the control device 10 of this invention, it can be seen that the control device 10 is adapted to contain all of the system parts illustrated in FIG. 2 except for the pneumatically operated heat exchanger device 16 and the pneumatic source 13. However, it is to be understood that in order to practice the pneumatic control system of this invention, the various parts of the control device 10 could be separately formed and interconnected by suitable conduits so that such parts need not function in a unitary housing means as illustrated in the drawings, as desired.

Accordingly, it can be seen that the control device 10 of this invention can be formed in a relatively simple and inexpensive manner to provide all of the components of the control system 12 of FIG. 2 except for the pneumatic source 13 and the pneumatically operated heat exchanging device 16 so that the control device 10 can be located on an inside wall of a building or the like completely remote from the pneumatically operated heat exchanger means 16 to control the operation thereof in a manner hereinafter described, the control device 10 having the housing 11 thereof made with ribs top and bottom to provide strength against bending and warping with the leak port lever assemblies 25 and 26 being made in channel shape to provide stiffness together with heavy flexure springs 29 and 30 to suspend such blade means 25 and 26 so that the control device 10 is highly accurate and operates in a manner now to be described.

Assuming that the lower pressure level of the pneumatic source 13, such as 16 p.s.i., is to be utilized by the control system 12 for controlling the pneumatically operated heat exchanger means 16 during the daytime operation wherein the condition controller means 18 will supply the pilot signal to the relay means 111 and that the higher the pressure level of the pneumatic source 13, such as 25 p.s.i., will be utilized to operate the heat exchanger means 16 during the nighttime operation of the system 12 wherein the condition controller means 17 will supply the pneumatic signal for the relay 111, and assuming that the operator has set the cam member 55 of the control device 10 in a desired set point position thereof wherein the previously calibrated adjusting means 39 and 40 of the blade means 25 and 26 will provide a set point temperature of 70° that the heat exchanger means is to maintain during the daytime and a temperature of 65° during the nighttime, the operation of the control system 12 during the daytime operation is as follows.

With the pneumatic pressure source 13 providing its lower output pressure level, such as 16 p.s.i., the spring 86 of the pressure responsive means 67 of the control device 10 maintains the diaphragm 73 against the valve seat 70 so that no fluid pressure is supplied through the first passage means 66 of the control device 10 to the valve 19 of the condition controller means 17. However, when such valve seat 70 of the pressure responsive means 67 is closed, no pressure fluid is being supplied to the actuator 92 of the normally opened valve means 91 so that the valve means 91 is in its open position. Similarly, no pressure fluid is supplied to the chamber 103 of the switching device 95 since the switching device is maintained in its normally closed position under the urging of spring 95'. Therefore, it can be seen that the low-pressure level of the source 13 is free to pass through the second passage means 89 to the outlet 22 of the valve 20 of the condition controller means 18 as well as through the branch passage 108 and into the chamber 104 of the switching means 95 since switching means 95 is maintained in its normally closed position under the urging of spring 95' holding valve member 100 against valve seat 99 preventing entrance of pressure fluid into cavity 102. With the valve member 100 of the switching device 95 closing the valve seat 99, it can be seen that the passage 89 of the control device 10 is also interconnected intermediate the restrictor 94 and the outlet 22 of the valve 20 of the condition controller means 18 to the pilot chamber 110 of the relay 111.

With the bimetal member 24 of the condition controller means 18 sensing the selected output temperature effect for the heat exchanger means 16, the bimetal member 24 is so positioned relative to the opening 22 of the valve 20 of the condition controller means 18 that the pilot pressure signal being delivered by the switching device 95, in the position illustrated in FIG. 2, to the pilot chamber of the relay 111 is such that the relay 111 has the pressure in the branch chamber 113 thereof that is supplied to the pneumatically operated heat exchanger means 16 at a pressure level that maintains the heat exchanger means 16 at a certain position thereof that produces the output temperature effect at the particular setting of the control device 10 whereby not only is the valve member 115 closed against the valve seat 114, but also the pilot pressure in the chamber 110 and the branch pressure in the chamber 113 are so balanced that the valve member 121 has its valve seat 127 seating against the extension 128 of the valve member 115 so that the branch chamber 113 is also out of fluid communication with the exhaust chamber 124 whereby the system remains in the condition illustrated in FIG. 2.

However, should the output temperature effect of the heat exchanger means 16 rise above the selected temperature setting of the cam 55 for the daytime operation, the bimetal member 24 warps or moves closer to the opening 22 of the valve 20 of the condition controller means 18 whereby the pneumatic signal being delivered to the pilot chamber 110 by the controller means 18 increases in pressure value so as to move the valve member 121 downwardly and carry the valve member 115 therewith in opposition to the force of the compression spring 116 to open the valve seat 114 and, thereby, introduce an increased pressure in the branch pressure chamber 113. The increased pressure in the branch chamber 113 is conveyed to the pneumatically operated heat exchanger 16 to cause the same to decrease its output temperature effect proportional to the increase in the pneumatic pilot signal being directed to the chamber 110 by the controller means 18. When the decreased output of the heat exhanger means 16 brings the temperature adjacent the bimetal member 24 back up to the selected temperature setting of the device 10, the relay means 111 returns to the position illustrated in FIG. 2. Conversely, should the output temperature effect of the heat exchanger means 16 as sensed by the bimetal member 24 fall below the selected temperature effect, the decreased temperature being sensed by the bimetal member 24 causes the same to warp away from the opening 22 of the valve 20 of the control means 18 so that the pilot signal to the pilot chamber 110 of the relay 111 decreases in value. The resulting differential pressure between the pilot chamber 110 and the branch chamber 113 causes the valve member 121 to move upwardly from the position illustrated in FIG. 2 to open the valve seat 127 away from the valve extension 128 of the valve member 115 so that the branch chamber 113 is interconnected to the atmosphere through the exhaust chamber 124. Accordingly, the pressure in the branch chamber 113 decreases so that the pressure to the pneumatically operated heat exchanger 16 decreases whereby the heat exchanger means 18 increases its heating output proportionately to the decrease in the pneumatic pilot signal being directed to the chamber 110 at the relay 111 by the controller means 18. Thus, when the selected temperature effect setting of the control device 10 is subsequently reached by the heat exchanger means 16, the bimetal member 24 moves back toward the valve member 20 of the controller means 18 to return the relay means 111 to the position illustrated in FIG. 2.

Therefore, it can be seen that the controller means 18, by varying the position of the bimetal member 24 relative to the valve 20 thereof, is adapted to maintain a selected output temperature effect for the heat exchanger means 16 throughout the entire time that the pneumatic pressure source 13 is providing the control pressure at its lower pressure level.

When it is desired to switch the system 12 over to its nighttime operation, either by manual change in the setting of the output pressure level of the source 13 or by an automatic timer switching operation, the change in the output pressure level of the source 13 to the higher pressure level, such as 25 p.s.i., causes the system 12 to switch over to its nighttime operation so that the heat exchanger means 16 will be controlled by the nighttime condition controller means 17.

In particular, when the pressure being directed into the part 71 of the passage means 66 is at the higher pressure level of the source 13, such increased pressure in the chamber 76 of the pressure responsive means 67 overcomes the force of the compression spring 86, which is set to be overcome by a pressure of about 20 p.s.i., when the two pressure levels being considered are 16 p.s.i. and 25 p.s.i. as previously described, whereby the diaphragm 73 moves away from the valve seat 70 so as to interconnect the pressure source 13 to the part 72 of the first passage means 66, and thus, to the valve 19 of the pressure control means 17. Simultaneously, the opening of the valve seat 70 directs fluid pressure to the actuator 132 of the reset means 130 and causes the normally open valve seat 168 to be closed by the diaphragm so that the passage 133 is disconnected from the atmosphere whereby the fluid pressure now being created between the resistors 138 and 107 in the part 72 of the first passage means 66 is directed to the actuator 92 of the normally opened pneumatically operated valve means to cause the same to close and thereby disconnect the condition controller means 18 from the source 13. Also, since the pressure source must pass through the restrictor 107 in the part 72 of the first passage means 66 before the same reaches the branch passage 106 disposed intermediate the restrictor 107 and the valve 19 of the condition controller means 17, a greater pressure is provided by the branch passage 105 into the chamber 103 of the switching means 95 than into the chamber 102 as provided by the branch passage 106 so that the resulting pressure differential across the diaphragm 101 causes the diaphragm 101 to move downwardly and overcome the force of spring 95' and thereby move the valve member 100 away from the valve seat 99 and into engagement with the valve seat 98 to disconnect the chamber 104 from the outlet 22 of the valve 20 of the condition controller means 18.

With the valve seat 99 now opened, it can be seen that the chamber 104 of the switching device 95 is now interconnected to the valve 19 of the controller means 17 so that the pilot signal being directed by the passage 109 into the pilot chamber 110 of the relay 111 is under the influence of the controller means 17 whereby the controller means 17 operates the pneumatically operated heat exchanger means 16 in the same manner as the controller means 18 previously described. Thus, such operation need not be further described except to state that the condition controller means 17 operates the output temperature effect of the heat exchanger means 16 to tend to maintain the same at the particular temperature setting level as has been previously selected by the cam member 55 for nighttime operation.

The restrictor 120 in the passage 119 that interconnects the pneumatic source 13 to the branch pressure chamber 113 of the relay 111 is provided to bleed the pneumatic pressure source 13 to the branch pressure chamber 113 to initially keep the relay 111 balanced with the valve member 121 against the valve part 128 so as to prevent or eliminate a hysteresis effect.

Therefore, it can be seen that the improved control system 12 and control device 10 of this invention are so constructed and arranged that the control device 10 is adapted to automatically switch the operation of the pneumatically operated device 16 between the controller means 17 and 18 depending upon the change in pressure level of the pneumatic source 13.

For example, with the control system 12 previously operating under the higher pressure level of the pneumatic source 13, a subsequent change in the output pressure level of the source 13 from its higher pressure level to its lower pressure level cause the flexible diaphragm 73 of the pressure responsive means 67 to close against valve seat 70 and thereby terminate the flow of fluid through the first passage means 66 to the controller means 17 whereby the previously closed valve seat 168 will open to interconnect the atmosphere to the passage 133 and, thus, to the valve 92 to open the same so that the source 13 is again interconnected to the valve 20 of the condition controller means 18.

With the loss of pressure in the chamber 103 of the switching means 95 by the closing of the diaphragm 73 against the valve seat 70 of the pressure responsive means 67 and the interconnecting of the passage 133 to the atmosphere, the pressure in chamber 103 is exhausted allowing switching means 95 to return to its normally closed position under the urging of spring 95' so that the system 12 is now completely switched over to the lower pressure setting thereof whereby the controller means 18 will operate the heat exchanger device 16 in the manner previously described.

The plunger means 83 of the pressure responsive means 87 of the system 12 is so constructed and arranged that the end 85 thereof protrudes from the housing means 11 when the diaphragm 73 is moved upwardly because the pressure source 13 is providing its higher pressure control level.

This feature makes it possible to check the calibration of both leak port means of the controller means 17 and 18 of the control device 10 or to recalibrate either in a building or the like with only the use of the higher pressure output level of the source 13 because the operator can push downwardly on the protruding portion 85 of the reset member 83 to manually close the diaphragm 73 against the valve seat 70 so that at the higher pressure level, the system 12 will be switched over from the controller means 17 to the controller means 18 for such checking or calibration operation. This eliminates the need for the operator having to switch the pressure level of the source 13 back to its lower pressure level to go through an entire building to check the calibration of the controller means 18 for each control device 10 after having gone through the same procedure with the controller means 17 at the higher pressure level setting of the pressure source 13.

While the above described use of the plunger 85 of the pressure responsive means 67 can be utilized to temporarily switch over the control system 12 to the daytime operation of the controller means 18 when the source 13 is supplying the higher pressure level, it may be desired to have the control system 12 operate with the daytime controller means 18 in a continuous manner even though the high-pressure level is being supplied by the source 13.

In this latter situation, the manually operated reset means 130 of this invention can be utilized.

In particular, when the lever 135 of the reset means 130 is moved from the full line position of FIG. 9 to the phantom line position thereof when the system 12 is operating at the high-pressure level thereof, the conduit or passage 133 is interconnected to the atmosphere and, thus, the chamber 103 of the switching means 95 and actuator 92 of the cutoff valve 91 are interconnected to the atmosphere so that the compression spring 95' moves the valve member 100 of the switching means 95 against the valve seat 99 and the cutoff valve 91 is opened so that the system is switched over to the daytime pressure controller means 18 in the manner previously described and remains under the influence of the controller means 18 as long as the lever 135 remains in the phantom line position of FIG. 9. However, the lever 135 can be returned manually to the position illustrated in full lines in FIG. 9 to return to nighttime operation by the controller means 17 if desired. However, when the control pressure level from the source 13 drops to its lower pressure level, the diaphragm 73 of the pressure responsive means 67 closes against the valve seat 70 so that the controller nozzle 19 will bleed the actuator 132 of the reset means 130 to its deactuated condition whereby the tension spring 154 can again return the lever 135 to the rotational position illustrated in full lines in FIG. 9.

Accordingly, it can be seen that not only does this invention provide an improved pneumatic control system, but also this invention provides an improved control means and reset means for such a system or the like.

What is claimed is:

1. A pneumatic control system comprising a pair of condition controller means each having a sensor and a bleed-type pneumatic valve operated thereby, a source of control fluid having two different control pressure levels, a pneumatically operated device, relay means operatively interconnected to said source for directing a branch signal of said control fluid to said pneumatically operated device in relation to a pilot signal directed to a pilot chamber of said relay means by said controller means, first passage means for interconnecting said source to said valve of one of said controller means, second passage means for interconnecting said source to said valve of the other of said controller means, pressure responsive means in said first passage means for preventing fluid communication therethrough when said source is at one pressure level thereof and permitting fluid communication therethrough when said source is at its other pressure level, third passage means adapted to interconnect said first passage means intermediate said pressure responsive means and said one controller means to said pilot chamber and adapted to interconnect said second passage means to said pilot chamber, switching means in said third passage means having one position for interconnecting only said second passage means to said pilot chamber whereby the pilot signal for said relay means is provided only by said other controller means and having another position for interconnecting only said first passage means to said pilot chamber whereby the pilot signal for said relay means is provided only by said one controller means, and reset means in said first passage means intermediate said pressure responsive means and said one controller means for switching said switching means from said other position thereof to said one position thereof when said source is at its said other pressure level.

2. A pneumatic control system as set forth in claim 1 wherein said switching means has means for automatically moving to said other position thereof to interconnect said first passage means to said pilot chamber of said relay means when said pressure responsive means provides fluid communication through said first passage means by said source providing said other pressure level thereof and for moving to said one position thereof when said pressure responsive means prevents fluid communication through said first passage means by said source providing said one pressure level thereof.

3. A pneumatic control system as set forth in claim 2 wherein said automatic means of said switching means comprises pneumatically operated valve means.

4. A pneumatic control system as set forth in claim 3 wherein fourth passage means interconnect said first passage means intermediate said pressure responsive means and said one controller means to said pneumatically operated means of said switching means and to said pneumatically operated valve means.

5. A pneumatic control system as set forth in claim 4 wherein said pneumatically operated valve means comprises a valve seat interconnected to said fourth passage means, a pneumatic actuator, and movable lever means operatively associated with a valve member means for opening and closing said valve seat, said lever means being operatively interconnected to said actuator to be moved thereby.

6. A pneumatic control system as set forth in claim 4 wherein said pneumatically operated valve means comprises a valve seat interconnected to said fourth passage means, a pneumatic actuator, and movable lever means operatively associated with a valve member means for opening and closing said valve seat, said lever means being operatively interconnected to said actuator to be moved thereby.

7. A pneumatic control system as set forth in claim 3 wherein a fourth passage means interconnects said first passage means intermediate said pressure responsive means an said one controller means to said pneumatically operated valve means.

8. A pneumatic control device comprising a housing means, a pair of condition controller means carried by said housing means and each having a sensor and a bleed-type pneumatic valve operated thereby, said housing means having a relay means therein adapted to be interconnected to a pneumatic source of control fluid having two different control pressure levels for directing a branch signal of said control fluid to a pneumatically operated device in relation to a pilot signal directed to a pilot chamber of said relay means by said controller means, first passage defining means in said housing means adapted to interconnect said source to said valve of one of said controller means, second passage defining means in said housing means adapted to interconnect said source to said valve of the other of said controller means, pressure responsive means in said first passage means of said housing means for preventing fluid communication therethrough when said source is at one pressure level thereof and permitting fluid communication therethrough when said source is at its other pressure level, third passage defining means in said housing means adapted to interconnect said first passage means intermediate said pressure responsive means and said one controller means to said pilot chamber and adapted to interconnect said second passage means to said pilot chamber, switching means in said third passage means of said housing means having one position for interconnecting only said second passage means to said pilot chamber whereby the pilot signal for said relay means will be provided only by said other controller means and having another position for interconnecting only said first passage means to said pilot chamber whereby the pilot signal for said relay means will be provided only by said one controller means, and reset means in said first passage means intermediate said pressure responsive means and said one controller means for switching said switching means from said other position thereof to said one position thereof when said source is at its said other pressure level.

9 A pneumatic control device as set forth in claim 8 wherein said switching means has means for automatically moving to said other position thereof to interconnect said first passage means to said pilot chamber of said relay means when said pressure responsive means provides fluid communication through said first passage means by said source providing said other pressure level thereof and for moving to said one position thereof when said pressure responsive means prevents fluid communication through said first passage means by said source providing said one pressure level thereof.

10. A pneumatic control device as set forth in claim 9, wherein said automatic means of said switching means comprises pneumatically operated means and wherein said reset means comprises pneumatically operated valve means.

11. A pneumatic control device as set forth in claim 10 wherein fourth passage defining means is provided in said housing means and interconnects said first passage means intermediate said pressure responsive means and said one controller means to said pneumatically operated means at said switching means and to said pneumatically operated valve means.

12. A pneumatic control device as set forth in claim 10 wherein said pneumatically operated valve means comprises a valve seat interconnected to said fourth passage means, a pneumatic actuator, a movable lever means operatively associated with a valve member means for opening and closing said valve seat, said lever means being operatively interconnected to said actuator to be moved thereby.

13. A pneumatic control device as set forth in claim 8 wherein said reset means comprises a pneumatically operated valve means which closes when said pressure responsive means permits fluid communication through said first passage means, said reset means having manual means for opening said valve means when the same is closed by said pressure responsive means.

14. A pneumatic control device as set forth in claim 13 wherein said housing means has a fourth passage means that interconnects said first passage means intermediate said pressure responsive means and said one controller means to said pneumatically operated valve means.